United States Patent
Lin

(10) Patent No.: US 9,303,831 B2
(45) Date of Patent: Apr. 5, 2016

(54) SPECTRUM CONVERTING DEVICE AND A METHOD FOR MAKING THE SAME

(71) Applicant: Genius Electronic Optical Co., Ltd., Taichung (TW)

(72) Inventor: Chih-Shen Lin, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/323,852

(22) Filed: Jul. 3, 2014

(65) Prior Publication Data

US 2015/0276149 A1 Oct. 1, 2015

(30) Foreign Application Priority Data

Mar. 27, 2014 (TW) .............................. 103111395 A

(51) Int. Cl.
| | | |
|---|---|---|
| H01J 1/62 | (2006.01) | |
| H01J 63/04 | (2006.01) | |
| F21K 99/00 | (2010.01) | |
| B29C 43/00 | (2006.01) | |
| B29K 105/00 | (2006.01) | |
| B29K 63/00 | (2006.01) | |
| B29L 11/00 | (2006.01) | |

(52) U.S. Cl.
CPC ................ *F21K 9/56* (2013.01); *B29C 43/003* (2013.01); *F21K 9/90* (2013.01); *B29K 2063/00* (2013.01); *B29K 2105/251* (2013.01); *B29K 2995/0035* (2013.01); *B29L 2011/00* (2013.01)

(58) Field of Classification Search
CPC .. G02B 26/008; G02B 26/007; H04N 9/3158; H04N 9/315; H04N 9/3197; H04N 9/3111; F21S 10/007

USPC ............ 362/84, 231, 235, 293, 319; 313/483, 313/501, 502, 512
See application file for complete search history.

(56) References Cited

U.S. PATENT DOCUMENTS

| | | | | |
|---|---|---|---|---|
| 9,146,452 | B2* | 9/2015 | Guthrie | G03B 21/204 |
| 2009/0034284 | A1* | 2/2009 | Li | G03B 33/06 362/554 |
| 2012/0147601 | A1* | 6/2012 | Li | G03B 21/204 362/231 |
| 2013/0271954 | A1* | 10/2013 | Li | H04N 9/3114 362/84 |
| 2014/0043829 | A1* | 2/2014 | Wu | G02B 26/008 362/324 |
| 2014/0118991 | A1* | 5/2014 | Lin | G02B 26/008 362/84 |
| 2014/0168613 | A1* | 6/2014 | Wang | G03B 21/204 353/31 |
| 2014/0254130 | A1* | 9/2014 | Mehl | G03B 33/08 362/84 |

(Continued)

FOREIGN PATENT DOCUMENTS

TW        M448705 U1        3/2013

OTHER PUBLICATIONS

Office Action of corresponding TW application, published on May 18, 2015.

*Primary Examiner* — Nimeshkumar Patel
*Assistant Examiner* — Kevin Quarterman
(74) *Attorney, Agent, or Firm* — Baker & McKenzie LLP

(57) ABSTRACT

A fish attracting lamp with a removable spectrum converting device includes: a positioning unit for fixing the removable spectrum converting device to the fish attracting lamp; an optical element made of light transmitting material and positioned on the positioning unit of the fish attracting lamp; and a plurality of fluorescent particles disposed in the optical element. Part of the light emitted from the fish attracting lamp passes through the optical element and will change wavelength after passing through the fluorescent particles.

5 Claims, 8 Drawing Sheets

(56) References Cited

U.S. PATENT DOCUMENTS

2014/0362349 A1* 12/2014 Chiu .................... G03B 21/204 353/31

2015/0116982 A1* 4/2015 Jao ..................... G03B 21/2093 362/84

* cited by examiner

SPECTRUM CONVERTING DEVICE AND A METHOD FOR MAKING THE SAME

CROSS REFERENCE TO RELATED APPLICATIONS

This application claims the benefit of priority to TW 103111395, filed on Mar. 27, 2014 with the Intellectual Property Office of the Republic of China, Taiwan, the specification of which is incorporated herein in its entirety by reference.

BACKGROUND OF THE INVENTION

1. Field of the Invention

The present invention relates to an optical element, and more particularly to a fish attracting lamp with a removable spectrum converting device and a method for making the spectrum converting device.

2. Description of the Prior Art

Lamps have been widely used in various applications, in addition to illumination, lamps can also be used for other purposes, such as fish attracting lamp.

Conventional fish attracting lamps mostly uses tungsten or halogen as a light source, which, however, is a very power consumptive and will produce a lot of heat.

Therefore, the tungsten or halogen lamps are replaced with LED lamp. However, the light sources of the LED fish attracting lamp mostly are blue-light emitting diodes and ultraviolet light emitting diodes in which is sealed fluorescent powder, and the blue light or ultraviolet light emitting diodes sealed fluorescent powder are only able to produce light of fixed wavelength. Therefore, producing lights of different wavelengths requires the use of different lamps, which consequently increases not only the cost but also the installation space of the fish attracting lamps.

The present invention has arisen to mitigate and/or obviate the afore-described disadvantages.

SUMMARY OF THE INVENTION

The primary objective of the present invention is to provide a fish attracting lamp with a removable spectrum converting device and a method for making the spectrum converting device, which can overcome the disadvantage of the conventional lamp that is only capable of producing a light of fixed wavelength.

To achieve the above objective, a spectrum converting device in accordance with the present invention is disposed on an optical path of a fish attracting lamp to convert wavelength of the light emitted from the fish attracting lamp, the fish attracting lamp comprises:

a positioning unit for fixing the removable spectrum converting device to the fish attracting lamp;

an optical element made of light transmitting material and positioned on the positioning unit of the fish attracting lamp; and a plurality of fluorescent particles disposed in the optical element, wherein the light emitted from the fish attracting lamp passes through the optical element and will change wavelength after passing through the fluorescent particles.

To achieve the above objective, a method for making a spectrum converting device comprises the following steps:

preparing a plurality of optical bodies and fluorescent particles;

physically mixing the optical bodies with the fluorescent particles; and solidifying a mixture of the optical bodies and the fluorescent particles into an optical element containing the fluorescent particles.

Different colored lights can be used to attract different fishes, and the lamp of the present invention can produce different colored lights simply by replacement of the spectrum converting device.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-5, a removable spectrum converting device of a lamp A in accordance with a preferred embodiment of the present invention is disposed on the optical path of a lamp A to convert wavelength of the light. The lamp A is a fish attracting lamp and provided with a positioning unit A1, and the spectrum converting device 100 comprises an optical element 10 and a plurality of fluorescent particles 20 disposed in the optical element 10.

The optical element 10 is made of light transmitting material, such as Epoxy, silicon, acrylic, glass or other materials. The optical element 10 can be positioned on the positioning unit A1 of the lamp A.

The plurality of fluorescent particles 20 is disposed in the optical element 10. The light generated by the lamp A will pass through the optical element 10 and change wavelength after passing through the fluorescent particles 20, and the light generated by the lamp A can be converted into green and white light, cool white light, blue light or red light after passing through the optical element 10 which contains the fluorescent particles 20. It is to be noted that, in this embodiment, the fluorescent particles 20 are phosphor powder, in particularly, nitride phosphor. The use of the light is not limited to the above examples, and is mainly determined by the initial wavelength and target wavelength.

Figure 4:
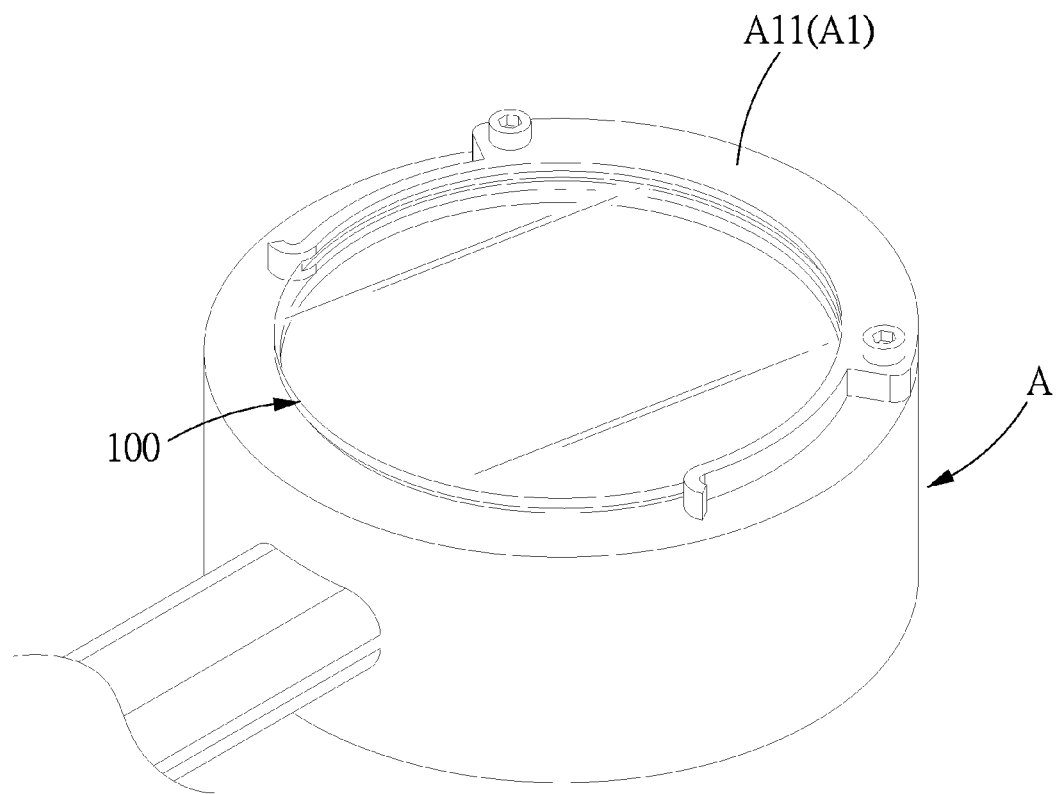
FIG. 4 shows that the spectrum converting device in accordance with the present invention is positioned on the lamp by an elastic c-shaped member.
Figure 5:
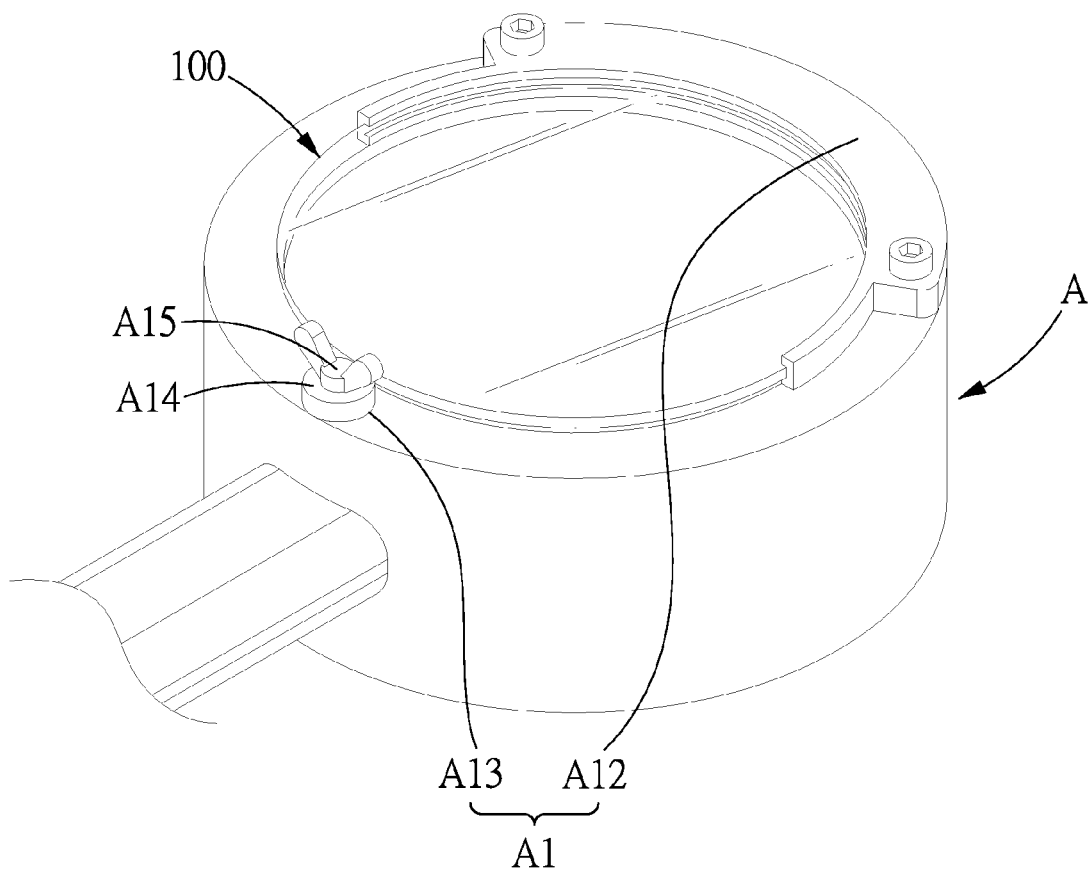
FIG. 5 shows that the spectrum converting device in accordance with the present invention is positioned on the lamp by a semicircular member and a locking member.

The positioning unit A1 can be in any forms as along as it can fix the spectrum converting device 100 and the lamp A. As shown in FIG. 4, the positioning unit A1 is a C-shaped elastic member A11 with two elastic ends and a middle portion between the two elastic ends, the middle of the C-shaped elastic member A11 is fixed to the lamp A, and the spectrum converting device 100 is clamped between the two elastic ends of the elastic member A11.

The positioning unit A1 can also be the combination of a semicircular member A12 and a locking member A13. The locking member A13 includes a rubber stop piece A14 and a nut A15. The spectrum converting device 100 is restricted between the semicircular member A12 and the stop piece A14 of the locking member A13, and can be fixed to or released from the spectrum converting device 100 by rotating the nut A15. The forms of the positioning unit A1 are not limited to the above example.

With the positioning unit A1, the spectrum converting device 100 can be replaced quickly, so that, with different colored fluorescent particles 20, the spectrum converting device 100 of the present invention is able to change the wavelength of the light and produce different colored lights. Hence, when the spectrum converting device of the present invention is used in a fish attracting lamp, the fish attracting lamp can produce different colored lights of different wavelengths to attract different types of fishes, as shown in the following table:

| Color of light | Purpose of use |
| --- | --- |
| Green | To attract fishes, especially skipjack |
| Cool white | To attract fishes, especially Saury |
| Blue | To attract fishes, especially Squid and cuttlefish |
| Red | Attract the fishes to the shallow water for easy capture |

It is learned from the above table that different colored lights can be used to attract different fishes, and the lamp A can produce different colored lights simply by replacement of the spectrum converting device 100.

In actual application, a spectrum converting device 100 for producing cool white light or spectrum converting devices 100 for all mixed lights can be used to attract fishes from far distance to near distance, then spectrum converting device 100 for producing red light attracts the fishes to the shallow water area for easy capture of the fish.

Figure 1:
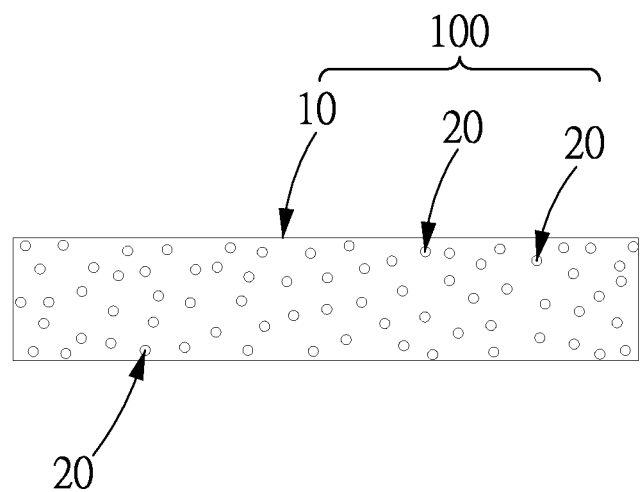
FIG. 1 is a side view of a spectrum converting device in accordance with a preferred embodiment of the present invention.
Figure 2:
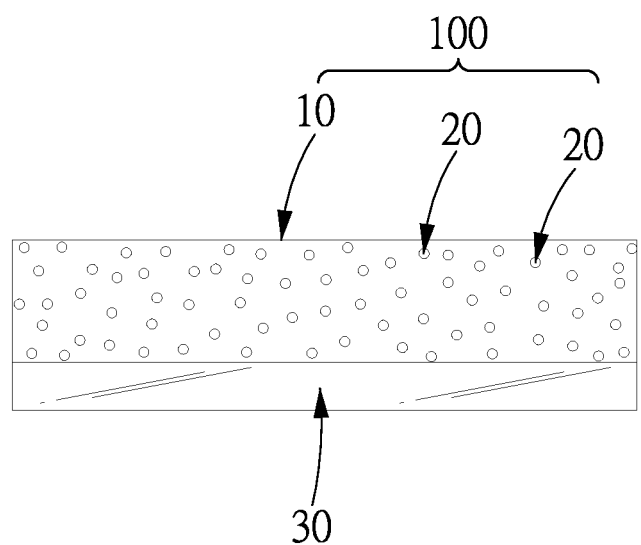
FIG. 2 is a side view showing that a light transmitting member is provided at one side of the optical element of the spectrum converting device in accordance with the present invention.
Figure 3:
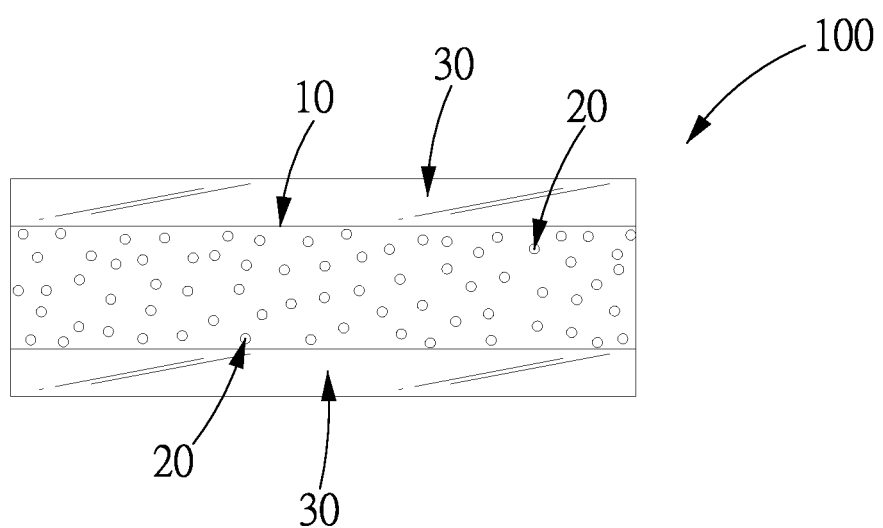
FIG. 3 is a side view showing that a light transmitting member is provided at both sides of the optical element of the spectrum converting device in accordance with the present invention.

To improve the luminous efficacy of the lamp A, a light transmitting member 30 made of Epoxy or glass can be provided at one side of the optical element 10, as shown in FIG. 2. The light emitted from the lamp A will change wavelength when passing through the fluorescent particles 20 of the optical element 10, and the luminous efficacy of the lamp A will also be improved through the fraction of the light transmitting member 30. Of course, the light transmitting member 30 can also be disposed at both sides of the optical element 10, as shown in FIG. 3.

Figure 6:
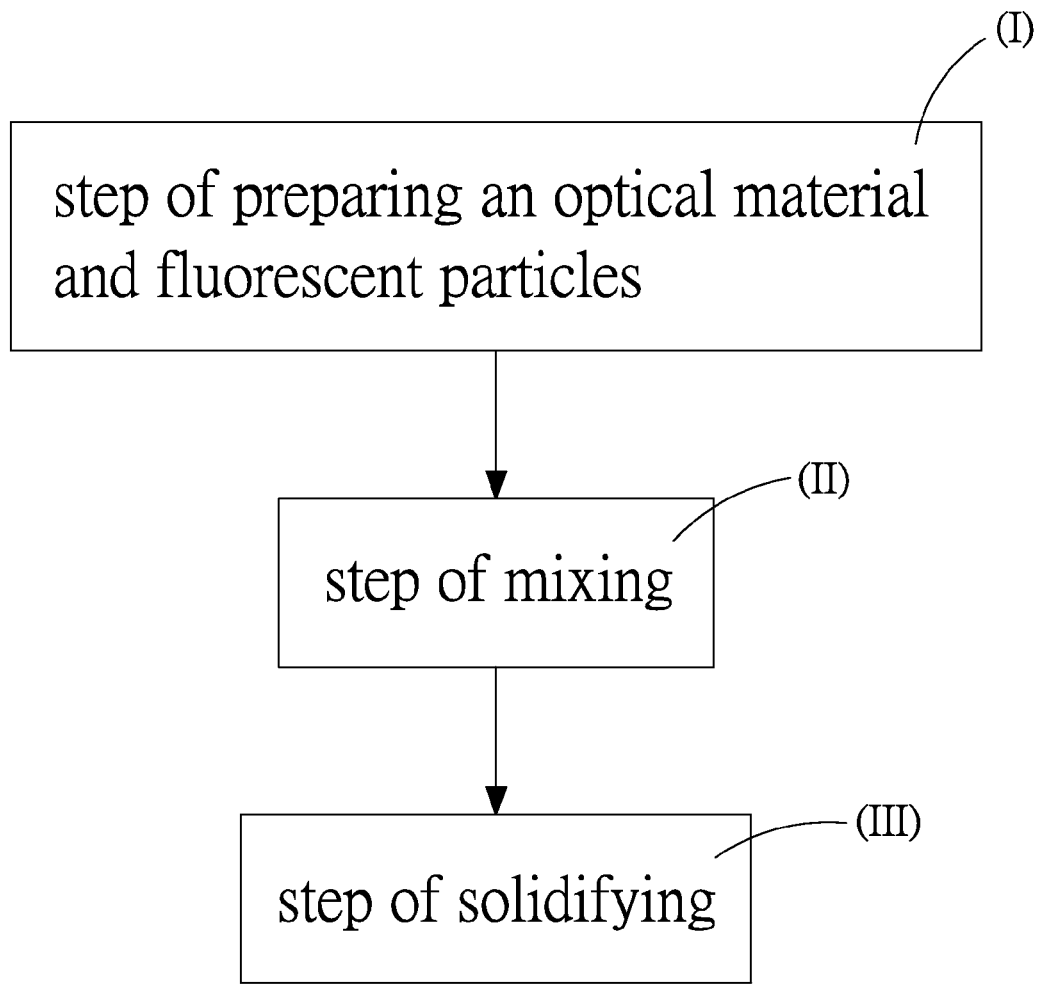
FIG. 6 is a flow chart showing the steps of a method for making the abovementioned spectrum converting device.
Figure 7:
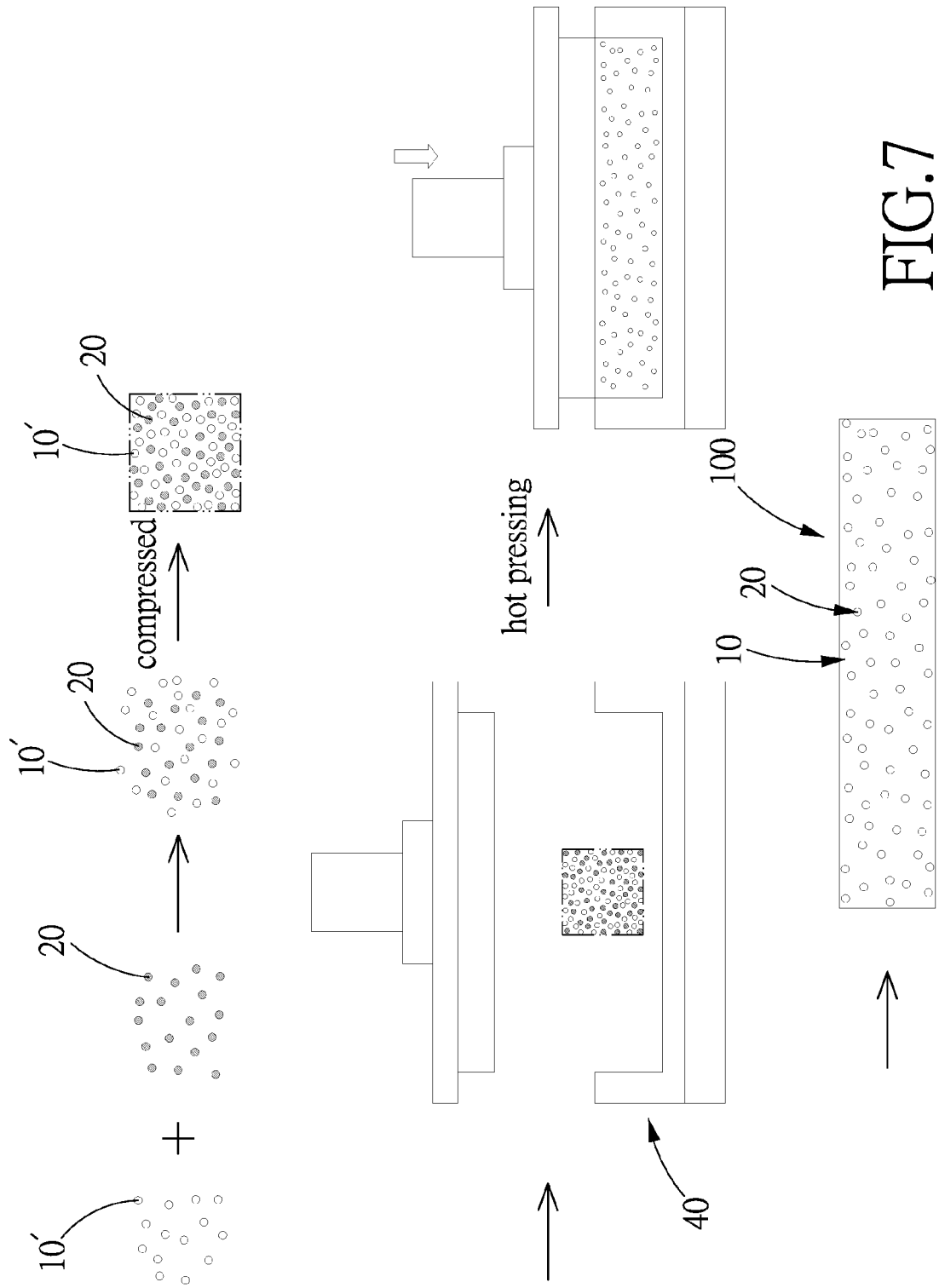
FIG. 7 is an operational view illustrating the method for making spectrum converting device of the present invention.
Figure 8:
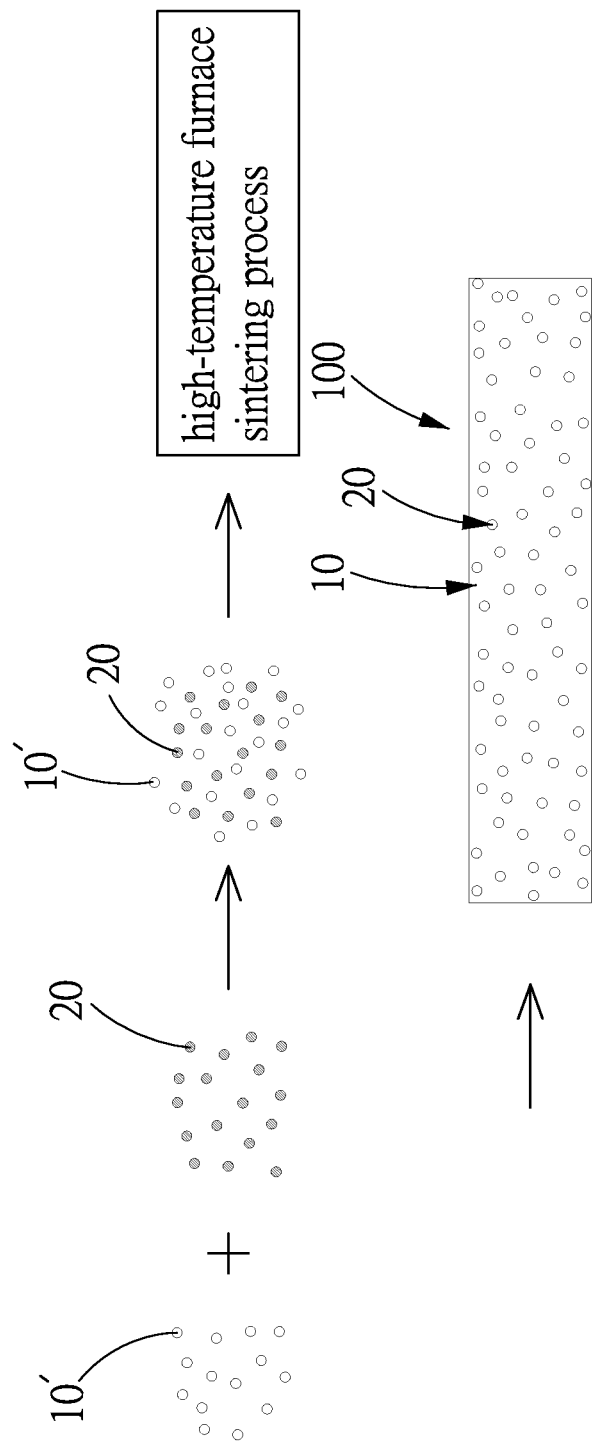
FIG. 8 is another operational view illustrating the method for making spectrum converting device of the present invention.

A method for making the abovementioned spectrum converting device, as shown in FIGS. 6-8, comprises the following steps:

A step I of preparing an optical material and fluorescent particles: preparing a plurality of optical bodies 10' and fluorescent particles 20. In this embodiment, the optical bodies 10' are Epoxy or low temperature Poly-silicon in the form of powder or particles.

Step II of mixing: physically mixing of the optical bodies 10' with the fluorescent particles 20, and in this embodiment, the optical bodies 10' and fluorescent particles 20 are mixed up by stirring.

Step III of solidifying: solidifying the mixture of the optical bodies 10' and the fluorescent particles 20 into the optical element 10 containing the fluorescent particles 20.

When the optical bodies 10' are made of Epoxy materials, fiberglass can be added in the step of mixing as a reinforcement material, after the fiberglass is mixed with the optical bodies 10' and fluorescent particles 20, the mixture of the fiberglass, the optical bodies 10' and the fluorescent particles 20 should be compressed and placed into a mold 40 which has been preheated to 50-100° C., then the mold 40 is continued to be heated to 150-200° C., then the mixture of the fiberglass, the optical bodies 10' and the fluorescent particles 20 is solidified by hot pressing process at the temperature of 100-200° C., and under a pressure of 1.96-19.6 Mpa, as shown in FIG. 7.

If the optical bodies 10' are low-temperature poly-silicon, the mixture obtained from the step of mixing is put into a high-temperature furnace with a temperature of 300-1400° C. and solidified through sintering process, as shown in FIG. 8.

Through the above steps of the method, the spectrum converting device 100 is produced and then used in combination with the positioning unit A1 to change the color of the light emitted from the lamp A.

While we have shown and described various embodiments in accordance with the present invention, it is clear to those skilled in the art that further embodiments may be made without departing from the scope of the present invention.

What is claimed is:

1. A fish attracting lamp with a removable spectrum converting device, the removable spectrum converting device being disposed on an optical path of the fish attracting lamp to convert wavelength of the light emitted from the fish attracting lamp, the fish attracting lamp comprising:
    a positioning unit for fixing the removable spectrum converting device to the fish attracting lamp;
    an optical element made of light transmitting material and positioned on the positioning unit of the fish attracting lamp; and
    a plurality of fluorescent particles disposed in the optical element, wherein part of the light emitted from the fish attracting lamp passes through the optical element and will change wavelength after passing through the fluorescent particles.

2. The fish attracting lamp as claimed in claim 1, wherein a light transmitting member is provided at one side of the optical element and capable of improving luminous efficacy of the fish attracting lamp through refraction.

3. The fish attracting lamp as claimed in claim 1, wherein a light transmitting member is provided at both sides of the optical element and capable of improving luminous efficacy of the fish attracting lamp through refraction.

4. The fish attracting lamp as claimed in claim 1, wherein the positioning unit is a C-shaped elastic member fixed to the fish attracting lamp.

5. The fish attracting lamp as claimed in claim 1, wherein the positioning unit includes a semicircular member and a locking member.

* * * * *